May 10, 1960     J. C. WINSLOW     2,935,905
COLLET FOOT ATTACHMENT FOR PNEUMATIC POWER DRILL
Filed Dec. 10, 1956     2 Sheets-Sheet 1
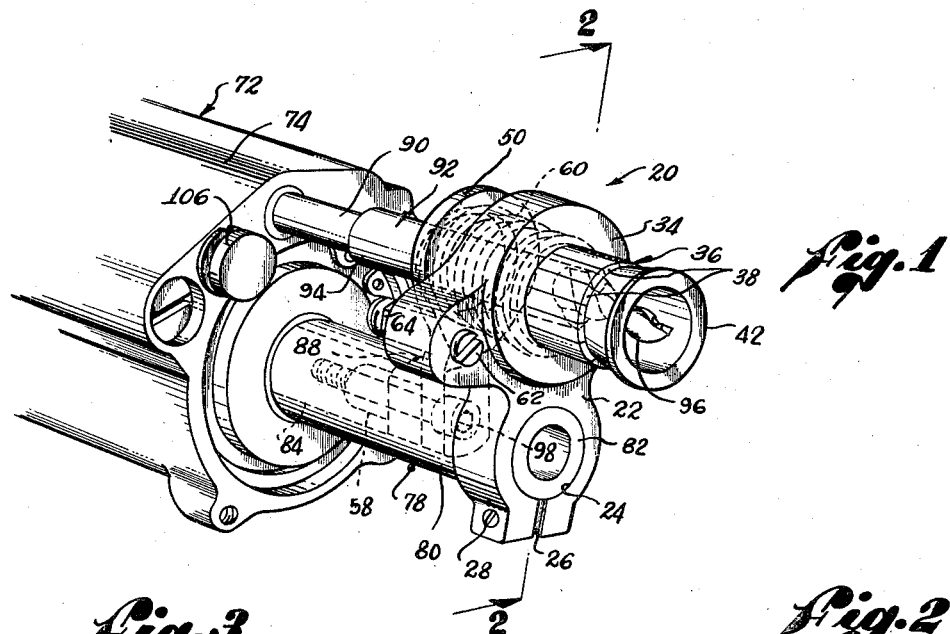
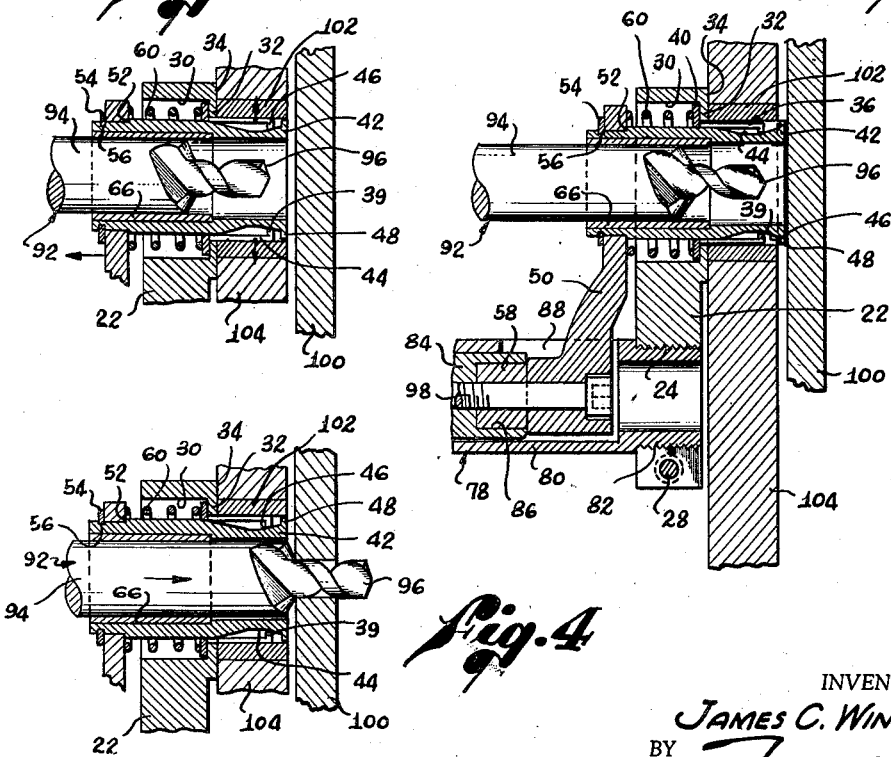
INVENTOR.
JAMES C. WINSLOW
BY
ATTORNEY

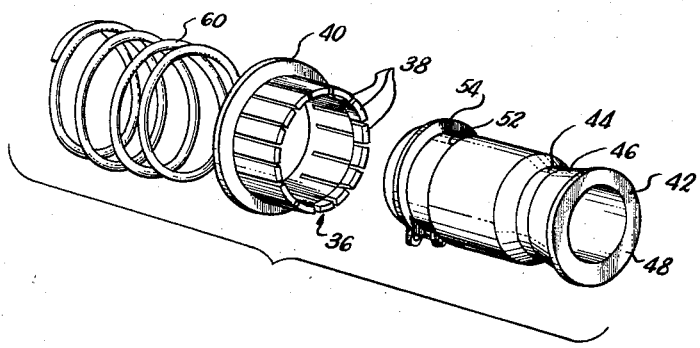
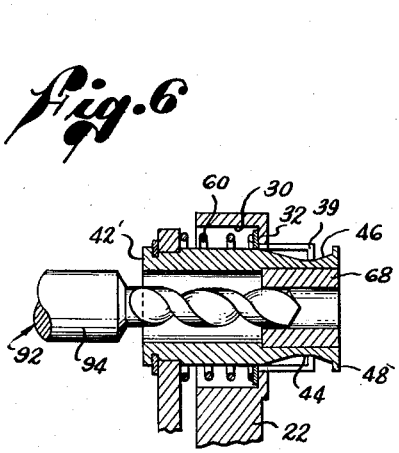
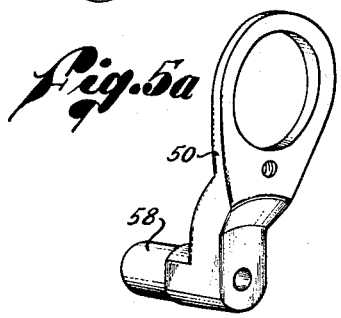
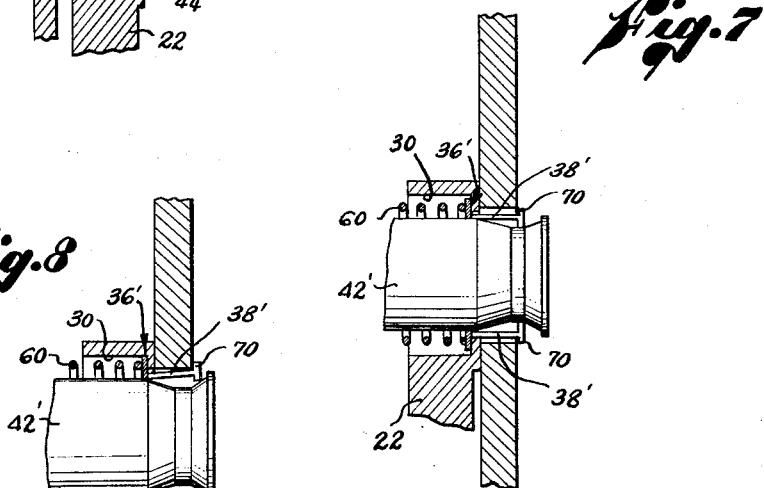
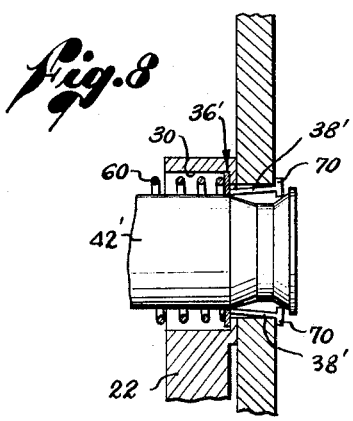
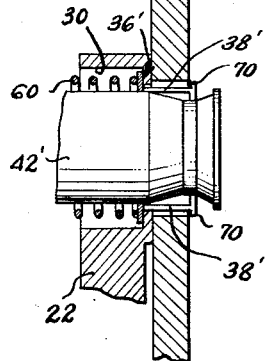

United States Patent Office 2,935,905
Patented May 10, 1960

2,935,905

COLLET FOOT ATTACHMENT FOR PNEUMATIC POWER DRILL

James C. Winslow, Sierra Madre, Calif., assignor to Winslow Product Engineering Corporation, Los Angeles, Calif., a corporation of California Application December 10, 1956, Serial No. 627,213

12 Claims. (Cl. 77—55)

This invention relates to improvements in portable drill tools of the character disclosed in my copending application, Serial No. 591,910, filed June 18, 1956, now abandoned, and entitled "Pneumatic Power Drill With Spacing Device." The invention pertains more particularly to an attachment for converting my prior drill tool to use with a drill jig.

Briefly, the prior drill tool comprises a generally cylindrical drill body formed with a pistol grip handle adapted to be grasped by a user of the tool. Telescopically supported in and extending forwardly of the drill body is a ram comprising an outer sleeve in which a piston rod is axially slideable.

The rod is fixed, at its rear end, to a piston which is movable in a cylinder formed in the drill body. A pneumatic control system, including an actuating trigger on the handle, is embodied in the drill for controlling admission of pressure air from an inlet on the handle to the cylinder.

Normally, that is prior to depression of the trigger, the ram sleeve occupies an axially extended position relative to the drill body and the rod is positioned forwardly in the sleeve. The pneumatic control system is operative, in response to depression of the trigger, to cause rotation of the spindle of the drill, initial rearward movement of the rod in the sleeve and subsequent retraction of the sleeve and rod toward the drill body.

My prior drill tool is intended primarily for use in drilling rows of equally spaced holes in the structural members of aircraft during construction of the latter.

To this end, there is removably mounted on the forward end of the ram a work-engaging collet foot attachment including an expansive collet engageable in a predrilled hole. The spacing between the collet and drill spindle, which spacing determines the center distance between drilled holes, is adjustable to accomplish drilling of holes with different spacings.

In many instances of aircraft manufacture, however, a series of holes must be drilled in an irregular pattern and/or with extremely accurate center distances. In such cases, a drill jig is generally employed to accurately locate the drill spindle relative to the work.

An object of this invention is the provision of a work engaging collet foot attachment which is adapted to be mounted on a drill tool of the character described for converting the tool to use with a drill jig.

Another object is the provision of an attachment of the class described which accomplishes accurate coaxial alignment of the cutting bit of the drill tool with the drill bushing of the jig and rigid clamping of the drill tool to the jig.

Yet another object is the provision of an attachment of the class described which is of relatively simple, inexpensive construction.

A further object is the provision of a portable drill tool of the character described including a collet foot for accurately aligning the cutting bit of the tool with the drill bushing of a drill jig and rigidly clamping the drill tool to the jig.

Other objects and advantages of the invention will become apparent as the description proceeds.

Briefly, the illustrative embodiments of the present attachment comprise a pressure foot or arm formed at one end with a threaded transverse bore for receiving the threaded forward end of the ram sleeve of my prior drill tool. The opposite end of the arm has a collet bore extending parallel to the threaded bore and spaced from the latter a distance equal to the spacing between the ram sleeve and spindle of the drill too.

In the assembled position of the present attachment on the drill tool, the arm extends radially from the ram sleeve and the collet bore of the arm is located concentric with the drill spindle axis.

Slideably received in the collet bore is a radially expansive collet sleeve, the forward end of which extends beyond the forward face of the arm. A series of circumferentially spaced, longitudinal slits are cut into the forward end of the collet sleeve to define a plurality of flexible collet fingers.

Extending slidably through the collet sleeve, concentric therewith is a collet expanding mandrel. This mandrel is of generally tubular construction and has a flared forward end engageable with the flexible fingers, to expand the latter, by rearward retraction of the mandrel in the collet sleeve.

The rear end of the mandrel mounts the outer end of a rigid radial extension arm whose inner end has means for attachment thereof to the piston rod within the ram sleeve of my prior drill tool, the arm extending through a slot in the ram sleeve. A coil compression spring encircling the mandrel and acting between the latter and the collet sleeve biases the mandrel rearwardly in the collet sleeve.

When the present attachment is mounted on my prior drill tool, the mandrel is normally retained in a forward position in the collet sleeve wherein the flexible collet fingers are contracted. When using the tool, the forward end of the contracted collet sleeve is first inserted in a bushing of a drill jig. Initial rearward movement of the piston rod in the ram sleeve, in response to depression of the actuating trigger of the tool, causes retraction of the mandrel in the collet sleeve. The flexible fingers of the collet sleeve are thereby expanded outwardly against the drill bushing.

Continued rearward movement of the piston rod and mandrel relative to the ram sleeve, with the collet fingers thus engaged, moves the attachment arm into tight clamping engagement with the jig. Subsequent retraction of the ram sleeve and piston rod therein, relative to the drill body, causes relative advancing of the now rotating cutting bit, which is slideably journalled in the tubular mandrel, into cutting engagement with the work.

The attachment mounts a stop engageable with depth control means on the drill tool for limiting the depth of penetration of the bit into the work, and causing automatic extension of ram, collet sleeve and mandrel to their normal extended positions. The tool is thereby released from the jig in readiness for drilling of the next hole.

A better understanding of the invention may be had from the following detailed description thereof, reference being had therein to the attached drawings, wherein:

Figure 1 is a view in perspective showing a portion of my prior drill tool having the present collet foot attachment mounted thereon;

Figure 2 is a section taken along line 2—2 of Figure 1 showing the parts of the present attachment in the positions they occupy prior to a drilling operation;

Figure 3 is a view of a portion of the present attachment illustrating the parts in one operative position;

Figure 4 is a view similar to Figure 3 illustrating the parts in another operative position;

Figure 5 is an exploded view of certain parts of the present attachment;

Figure 5a is a perspective view of another part of the attachment;

Figure 6 illustrates a modified form of the invention; and

Figures 7 and 8 illustrate a further modified form of the invention in two different positions of operation.

The present work engaging foot attachment, illustrated in Figures 1–5, is generally indicated at 20 and comprises a pressure foot or arm 22, one end of which is formed with a transverse, internally threaded bore 24. This end of the arm has a slot 26, the portions of the arm at opposite sides of the slot being adapted to be urged together by a clamp screw 28 for reasons to be described.

Extending through the opposite end of arm 22, parallel to the bore 24, is a collet bore 30. One end of the latter bore 30 is restricted by an inwardly extending annular shoulder 32. The face 34 of the arm, adjacent the shoulder 32, is hereinafter referred to as its forward face.

Slideably received in bore 30 is a collet sleeve 36. The forward end of the collet sleeve extends forwardly of the face 34 of the attachment arm and has a series of longitudinal slits defining flexible collet fingers 38. Forward movement of the collet sleeve 36 in the bore 30 is limited by abutment of a rear annular shoulder 40 on the sleeve with the internal shoulder 32. Collet sleeve shoulder 40 is slideably guided in bore 30, and the slotted forward end of the sleeve, in its normal contracted condition, has a sliding fit in the shoulder 32.

A tubular collet-expanding mandrel 42, appreciably longer than the collet sleeve 36, extends slideably through the latter. The mandrel is centrally reduced at 44 and continues forwardly therefrom in an outwardly flared or tapered portion 46. An annular shoulder 48 is provided at the forward end of the mandrel.

Indicated at 50 is an arm which is circularly enlarged and bored at one end for fitting snugly over the rear end of the tubular mandrel 42. The arm is retained against axial movement on the mandrel by a shoulder 52 on the latter and a snap ring 54 fitting in a peripheral groove 56 in the mandrel. The opposite end of the arm 50 is formed with a rearwardly extending, circular lug 58 which is centrally bored for receiving a bolt, as described below.

Encircling the mandrel 42, between the collet sleeve 36 and the arm 50 and abutting the latter and the shoulder 40 on the collet sleeve is a coil compression spring 60. The diameter of the bore 30 in the attachment arm 22 is made slightly larger than the diameter of spring 60.

Spring 60 acts to normally bias the collet sleeve shoulder 40 against the shoulder 32 and to urge the mandrel rearwardly in the collet sleeve. In the rearward position of the mandrel in the collet sleeve, the collet fingers 38 are flexed radially outwardly to expanded positions by engagement of internal shoulders 39 thereon with the flared end 46 of the mandrel.

One side of the attachment arm 22, adjacent the end thereof having the bore 30, mounts an adjustable stop screw 62 paralleling the bore 30. Stop screw 62 has a lock nut 64 threaded thereon and serves a purpose hereinafter discussed.

The form of the foot attachment illustrated in Figures 1–5 is intended for use on drill tools having relatively high cutting speeds and/or relatively short feed strokes. To this end, the rear end of the tubular mandrel 42 is internally, annularly recessed for tightly receiving a sleeve bearing 66. As described more fully below, in high speed or short stroke drill tools, this sleeve bearing journals a smooth cylindrical shank on the cutting bit.

The form of the invention illustrated in Figure 6, on the other hand, is designed for use on drill tools having lower cutting speeds and relatively long feed strokes. In such applications, a hardened steel bushing 68 is press-fitted in the forward end of the mandrel 42' and journals the fluted end of the cutting tool, as will presently be described.

A further, somewhat modified form of the invention is illustrated in Figures 7 and 8 wherein the collet sleeve 36 of Figures 1–5 is modified to the extent of providing outwardly extending shoulders 70 on the free ends of the collet sleeve fingers 38'. In the normal contracted condition of the modified collet sleeve 36', of Figures 7 and 8, these shoulders define substantially an annular shoulder on the forward end of the collet sleeve. The purpose of these collet sleeve shoulders will be presently described.

The drill tool on which the illustrative attachments are intended to be mounted is generally designated at 72. As described more fully in my aforementioned copending application, this drill tool comprises a generally cylindrical drill body 74 having a pistol grip handle (not shown).

Telescopically mounted in and extending forwardly of the drill body 74 is a ram 78. Ram 78 comprises an outer sleeve 80 terminating at its forward end in a reduced threaded portion 82. Slideably received within the ram sleeve 80 is a piston rod 84, the forward end of which terminates somewhat rearwardly of the forward end of the sleeve 80 and is formed with an axial recess 86. The ram sleeve 80 has its wall longitudinally slotted at 88 adjacent the forward end of the rod 84.

Spaced from the ram 78 and extending parallel thereto is a drill spindle 90 removably secured to the forward end of which is a cutting bit 92. This cutting bit includes a rear cylindrical portion 94 and a forward fluted portion 96. For a more complete description of the tool 72, reference should be had to my previously identified copending application.

In assembly of the present foot attachment 20 on the drill tool 72, the attachment arm 22 is threaded on the threaded forward end 82 of the ram sleeve 80 and the mandrel 42 is located concentric with the axis of the drill spindle 90. Clamp screw 28 is now set to firmly fix the arm 22 to the ram sleeve. Extension arm 50 of the attachment is then inserted through the slot 88 in the ram sleeve and its cylindrical lug 58 is positioned in the axial recess 86 of piston rod 84. The opposite, circularly enlarged end of the extension arm 50 is now fitted over the mandrel 42 and locked in position by the snap ring 54. Finally, the extension arm is rigidly attached to the piston rod by a bolt 98.

Normally, that is prior to depression of an actuating trigger (not shown) on the pistol grip handle (not shown) of the drill tool 72, the ram sleeve 80 is retained in its extended position of Figure 1 and the piston rod 84 is retained in its forward position of Figure 2 relative to the ram sleeve 80. In these forward positions of the ram parts, the mandrel 42 is held in a forward position in the collet sleeve 36, against the action of spring 60, and the shoulder 40 of the collect sleeve is pressed against the shoulder 32 at the forward end of collect bore 30, as shown in Figure 2. The internal shoulders 39 at the forward ends of the collet fingers 38 now engage in the reduced portion 44 of the mandrel and the collet is in its normal contracted condition. Also, the tip of the cutting bit 92 is located rearwardly of the forward end of the mandrel, as shown.

When drilling a hole in a workpiece 100, the forward end of the contracted collet sleeve 36 is inserted into a drill bushing 102 of a drill jig 104, as illustrated in Figure 2. The jig 104 is fixed to the workpiece 100 in any conventional manner. The drilling operation is now initiated by depression of the trigger (not shown) on the drill tool 72.

As previously discussed, and as described in detail in my aforementioned copending application, the pneumatic system of the drill is operative in response to depression of the trigger to initially draw the piston rod 84 rearwardly in the ram sleeve. The extension arm 50 and mandrel 42 of the present attachment are drawn rearwardly with the piston rod.

The collet sleeve 36, however, will be retained in its forward limiting position of Figure 2 by the coil spring 60. This retraction of the mandrel relative to the collet sleeve brings the flared end 46 of the mandrel into engagement with the internal shoulders 39 of the collet fingers 38. These fingers are thereby expanded outwardly against the drill bushing 102 to lock the collet sleeve in the bushing (see Fig. 3). Further rearward retraction of the mandrel relative to the collet sleeve is now prevented.

If the forward face 34 of the attachment arm 22 abuts the jig 104, as shown in Figs. 2–4, further rearward retraction of the mandrel 42, extension arm 50, and piston rod 84 relative to the ram sleeve 80 and to said arm 22 is also prevented. If, however, a spacing exists initially between the forward face 34 of the attachment arm 22 and the jig 104, after the collect sleeve 36 has become frictionally locked in the drill bushing 102, the collet sleeve 36, mandrel 42, extension arm 50, and piston rod 84 wll remain stationary relative to the jig 104, while the ram sleeve 80, attachment arm 22 rigid thereon, and drill body 74, will be advanced toward the jig (assuming the latter and the work to be stationary members, as will be the case in most drilling operations involving drill jigs). The forward face 34 of the attachment arm 22 is thereby brought into abutment with the jig. During this latter relative movement of the parts, the collet sleeve and mandrel move rearwardly in the bore 30, relative to the arm 22, and the collet sleeve shoulder 40 moves away from the shoulder 32.

In either case, that is, whether the arm 22 initially abuts the jig, or is advanced into abutment with the jig, the attachment foot 20 and, therefore, the drill tool 72 become firmly clamped to the jig 104.

Further relative movement between the piston rod 84 and ram sleeve 80 is now prevented. The attachment foot 20, ram sleeve 80, and piston rod 84 are now retracted as a unit relative to the drill body 74. However, assuming, as indicated above, that the jig and work are stationary members, the attachment, ram sleeve and piston rod will actually remain stationary, while the drill body 74, as well as the drill spindle 90 and cutting bit 92 thereon are advanced toward the work.

As discussed in my copending application, depression of the trigger of the drill tool also effects driving of the drill spindle 90. The above described results advancing of the now rotating cutting bit 92 results in extension of the latter forwardly of the mandrel 42, and penetration thereof through the work, as illustrated in Figure 4.

As previously described, the mandrel 42 in Figures 1–5 has a sleeve bearing 66 press-fitted in its rear end for slideably journalling the cylindrical rear portion 94 of the cutting bit 92. This bearing arrangement is employed in drill tools having relatively short feed strokes and/or high spindle speeds. If the feed stroke is relatively long and the spindle speed relatively slow, the bearing arrangement of Figure 6 is used. In this arrangement, the hardened drill bushing 68 journals the fluted end of the cutting bit, as shown.

Only frictional locking of the collet sleeve in the drill jig is achieved with the collet sleeve construction of Figures 1–6. In some cases, it may be desirable to obtain more positive clamping of the tool to the jig. Such positive clamping can be achieved by the collet sleeve construction of Figures 7 and 8. In this form of the collet sleeve, the external shoulders 70 on the collet fingers 38' are arranged to engage over the drill jig when the collet is expanded, thereby providing a positive clamping action. The diameter of the annular shoulder defined on the collet sleeve by the shoulders 70, when the collet is contracted, will, of course, be made such as to enable insertion and retraction of the contracted sleeve into and from the drill jig bushing.

Indicated at 106 on the drill tool 72 is the actuating button of depth control means embodied in the tool. This depth control means is described and illustrated in my copending application so that a detailed description thereof will not be presented here. Suffice it to say that depression of the button 106 causes termination of spindle rotation and ram retraction and automatic return of the ram sleeve 80 and piston rod 84 to their normal, forwardly extended positions of Figures 1 and 2.

The adjustable stop 62 is located in alignment with the button 106 and is adjusted to engage the button, and thereby terminate the drilling operation, at a predetermined depth of penetration of the bit into the work.

Numerous modifications in the design and arrangement of parts of the invention within the scope of the following claims will be immediately apparent to those skilled in the art.

I claim:

1. In combination, a tool including a body, a spindle journalled in and extending forwardly of the body, a rotary tool bit at the forward end of said spindle, an axially extensible and retractible ram sleeve carried on and extending forwardly of the body parallel to said spindle, there being an opening in the sleeve adjacent the forward end thereof, a piston rod slideable in the sleeve; and a collet foot comprising an arm having forward and rear faces and a collet bore opening through said faces, means attaching said arm to said ram sleeve with said bore concentric with the axis of and receiving the spindle of the tool and with the forward face of the arm remote from the tool body, an expansive collet sleeve on said arm concentric with said bore, the forward end of said collet sleeve extending beyond the forward face of the arm and including a series of circumferentially spaced, laterally expandable elements, a tubular mandrel axially slideable in the collet sleeve and receiving the tool spindle, and means attaching the rear end of the mandrel to the piston rod of the tool through said opening in the ram sleeve for movement of the mandrel with the rod, and coacting means on said mandrel and elements for expanding the latter outwardly when the mandrel is moved rearwardly in the collet sleeve.

2. The subject matter of claim 1 wherein said elements comprise laterally flexible fingers.

3. The subject matter of claim 1 wherein said collet sleeve is axially slideable in said bore, and said coacting means including engaging surfaces on the mandrel and collet sleeve for causing rearward movement of the collet sleeve in the bore with the mandrel when the latter is moved rearwardly with said elements restrained against lateral expansion.

4. The subject matter of claim 3 including yieldable means engaging the mandrel and collet sleeve and acting to bias the latter forwardly in the bore and bias the mandrel rearwardly in the collet sleeve, and means limiting forward movement of the collet sleeve in the bore.

5. The subject matter of claim 1 including an internal bearing sleeve in said mandrel journalling said tool spindle for rotation about the axis of said collet sleeve.

6. A collet device, comprising a pressure foot having a forward face, a collet sleeve axially slidable on the foot, said collet sleeve having its axis extending in a transverse direction of said face and including a forward expansive portion extending forwardly of said face, yieldable means axially urging said collet sleeve forwardly in the foot, coacting stop means on said foot and collet sleeve to limit forward movement of the sleeve in the foot, a tubular collet-expanding mandrel open at its ends extending through and axially movable in said foot and sleeve, coacting means on the mandrel and sleeve for expanding said expansive sleeve portion upon rearward movement of the mandrel in the sleeve, said mandrel having internal cylindrical bearing means for slidably receiving and guiding a rotary cutting bit on a tool, and means for moving said mandrel in the collet sleeve to expand the latter.

7. A collet device comprising a pressure foot having a forward face, a collet sleeve axially slidable in the foot, said collet sleeve having its axis extending in a transverse direction of said face and including a forward, radially expansive portion extending forwardly of said face, a tubular collet-expanding mandrel open at its ends extending through and axially movable in said foot and sleeve, a spring acting between said mandrel and sleeve to urge the latter forwardly in the foot, coacting stop means on said foot and sleeve to limit forward movement of the sleeve in the foot, coacting means on the mandrel and sleeve for expanding said expansive sleeve portion upon rearward movement of the mandrel in the sleeve, said mandrel having internal cylindrical bearing means for slidably receiving and guiding a rotary cutting bit on a tool, and means for moving said mandrel in the collet sleeve to expand the latter.

8. A collet device comprising a pressure foot having a forward face, a collet sleeve carried by said foot with its axis extending in a transverse direction of said face, said collet sleeve including a forward end which extends forwardly of said face and is axially split to form a plurality of laterally flexible collet fingers, a tubular collet expanding mandrel extending through and axially movable in said foot and sleeve, coacting means on said mandrel and collet fingers for expanding said collet fingers upon rearward movement of the mandrel in the sleeve, said collet fingers having external, rearwardly facing shoulders at their forward ends, said mandrel having an internal cylindrical bearing means for slidably receiving and guiding a rotary cutting bit on a tool, and means for moving said mandrel in the collet sleeve to expand said fingers.

9. A collet device for a portable drill or like tool comprising a pressure foot having a forward face, means on said foot for attaching the latter to the tool, a collet sleeve carried by said foot with its axis extending in a transverse direction of said face, said collet sleeve including a forward, radially expansive portion extending forwardly of said face, a tubular collet-expanding mandrel open at its ends extending through and axially movable in said foot and sleeve, coacting means on the mandrel and sleeve for expanding said expansive sleeve portion upon rearward movement of the mandrel in the sleeve, said mandrel having internal cylindrical bearing means for slidably receiving and guiding a rotary cutting bit on the tool, and means for moving said mandrel in the collet sleeve to expand the latter.

10. A collet device for a portable drill or like tool, comprising an elongate pressure foot having a forward face, means adjacent one end of the foot for attaching the latter to the tool, a collet sleeve carried by the other end of said foot with its axis extending in a transverse direction of said face, said collet sleeve including a forward, radially expansive portion extending forwardly of said face, a tubular collet-expanding mandrel open at its ends extending through and axially movable in said foot and sleeve, coacting means on the mandrel and sleeve for expanding said expansive sleeve portion upon rearward movement of the mandrel in the sleeve, said mandrel having internal cylindrical bearing means for slidably receiving and guiding a rotary cutting bit on the tool, and a transverse arm fixed to the rear end of said mandrel by which the latter may be moved in the collet sleeve to expand the latter.

11. A collet device for a portable drill or like tool, comprising a pressure foot having a forward face, means on said foot for attaching the latter to the tool, a collet sleeve axially slidable in the foot with its axis extending in a transverse direction of said face, said collet sleeve including a forward radially expansive portion extending forwardly of said face, a tubular collet-expanding mandrel open at its ends extending through and axially movable in said foot and sleeve, coacting means on the mandrel and sleeve for expanding said expansive sleeve portion upon rearward movement of the mandrel in the sleeve, said mandrel having internal cylindrical bearing means for slidably receiving and guiding a rotary cutting bit on the tool, and means for moving said mandrel in the collet sleeve to expand the latter.

12. A collet device for a portable drill or like tool, comprising an elongate pressure foot having a forward face, means adjacent one end of said foot for attaching the latter to the tool, the other end of said foot having a collet bore opening through said forward face and the rear side of the foot, the rear end of said bore being enlarged to form a rearwardly facing shoulder at the forward end of the bore, a collet sleeve slidable in said bore, said sleeve including a forward, radially expansive portion extending forwardly of said face and a rear, forwardly facing shoulder engageable with said first-mentioned shoulder to limit forward movement of the collet sleeve in the bore, a tubular collet expanding mandrel slidable in said collet sleeve, a spring acting between said mandrel and collet sleeve to urge the latter forwardly in said bore, coacting means on said mandrel and collet sleeve for expanding said expansive sleeve portion upon rearward movement of the mandrel in the sleeve, a transverse arm fixed to the rear end of said mandrel by which the latter may be moved in the collet sleeve to expand the latter, and said mandrel having internal cylindrical bearing means for slidably receiving and guiding a rotary cutting bit on the tool.

References Cited in the file of this patent

UNITED STATES PATENTS

| | | |
|---|---|---|
| 1,806,891 | Chadwick | May 26, 1931 |
| 1,946,584 | Judge | Feb. 13, 1934 |
| 1,946,753 | Moberley | Feb. 13, 1934 |
| 2,195,026 | Eden | Mar. 26, 1940 |